Figure 1:
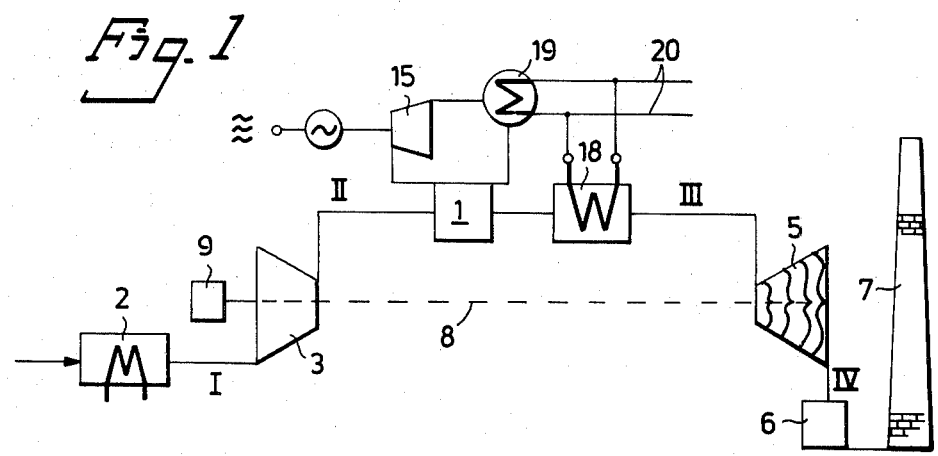

United States Patent [19]
Almlöf et al.

[11] 4,392,871
[45] Jul. 12, 1983

[54] COMBUSTION PROCESS WITH WASTE GAS PURIFICATION

[76] Inventors: Göran Almlöf, Skattegården 123, S-582 41 Linköping; Peter Hagqvist, Norrsvängen 1A, S-582 47 Linköping, both of Sweden

[21] Appl. No.: 409,327

[22] Filed: Aug. 18, 1982

Related U.S. Application Data

[63] Continuation of Ser. No. 195,922, Oct. 10, 1980, abandoned.

[30] Foreign Application Priority Data

Oct. 16, 1979 [SE] Sweden .............................. 7908565

[51] Int. Cl.³ ............................................. B01D 47/05
[52] U.S. Cl. ................................................ 55/23; 55/25; 55/55; 55/57
[58] Field of Search .................. 55/23, 29, 27, 44, 55, 55/73, 57, 67

[56] References Cited

U.S. PATENT DOCUMENTS

| | | | |
|---|---|---|---|
| 575,714 | 1/1897 | Heinzerling | 55/27 X |
| 3,012,629 | 12/1961 | Walker et al. | 55/67 |
| 3,511,027 | 5/1970 | Roberts et al. | 55/44 |
| 3,852,410 | 12/1974 | Rivers et al. | 55/73 X |
| 4,265,088 | 5/1981 | Funk | 55/23 |
| 4,312,851 | 1/1982 | Isalsai et al. | 55/23 |

*Primary Examiner*—John Adee
*Attorney, Agent, or Firm*—Kinzer, Plyer, Dorn & McEachran

[57] ABSTRACT

The invention relates to a combustion process with cleansing of the waste gases by compressing, cooling and expanding said gases.

The invention provides a continuous process in which highly contaminated low-grade fuels having a high water content can be effectively burned and the waste gases efficiently cleansed, by subjecting the cooled waste gases, together with residual non-desired substances, to a rapid drop in pressure in one or more stages by means of an expansion means (5), whereat the input drive power of the compressor (3), required for compressing said gases, is so high that the temperature downstream of the expansion means (5) is sufficiently low for the condensation and precipitation of frozen contaminants in the waste gases, together with ice crystals.

The invention can be applied to all forms of combustion plants, primarily combined power and heating plants fired with fuel having a high sulphur and water content.

3 Claims, 2 Drawing Figures

COMBUSTION PROCESS WITH WASTE GAS PURIFICATION

This is a continuation of application Ser. No. 195,922, filed Oct. 10, 1980, now abandoned.

The present invention relates to a combustion process with cleansing of the waste gases, in which water vapour and other non-desirable substances present in the waste gases, e.g. sulphur compounds, heavy metals and like contaminants, are condensed and/or precipitated out, and removed together with particulate matter by subjecting the waste gases to pressure and cooling and expanding said waste gases, each in one or more stages.

Methods of cleaning and/or demoisturizing process waste gases are known to the art, see for example, German Lay-out print No. 2 013 049, U.S. Pat. No. 3,012,629 and Swedish Patent Specification No. 345 006. These methods, however, are not sufficiently efficient to clean waste gases obtained from combustion processes, particularly when heavily contaminated gases generated when combusting sulphur-containing fuels also contain relatively high percentages of heavy metals. Consequently, attempts have been made to overcome the difficulties involved, by gassifying the fuel so as to obtain cleaner combustion, and by carrying out the combustion process in fluidized beds. Such methods, however, have lead to problems with process control and not readily handled residual products, besides lowering the efficiency.

The object of the invention is to provide a combined combustion and waste-gas cleaning process which, while maintaining high plant efficiency, enables the waste gases to be cleaned to a very high degree, even when combusting very poor fuels, such as very moist coals having a high sulphur content.

To this end the combustion process with waste-gas cleansing according to the invention has the characterizing features set forth in the following claims.

The process according to the invention can be considered a heat-pump process, because energy is sacrificed to the compressor, since the energy given off by the expansion means is not sufficient to carry out the compression process and therewith the process according to the invention. The construction of known high-pressure boilers has been one in which a waste-gas turbine is arranged to drive the compressor without additional power input.

One important advantage afforded by the process according to the present invention is that the contaminants are separated in a "clean" and concentrated form, without being chemically bound to any other substance than water. Poor fuels often contain large amounts of water which in known processes of this kind must be dissipated before combustion takes place, with a subsequent corresponding loss of energy. Such is not the case in the process according to the invention, where, in distinction, corresponding energy is utilized. Waste gases contain water vapour, but by cooling the gases in one or more stages to a temperature below dew points of water and sulphuric acid, the vapourization heat is utilized, while a good cleaning effect is obtained at the same time. Since poor fuels produce large amounts of ash and particulate material it is often suitable to circulate the condensation through special nozzles in a cooling stage, suitably an economizer, and flush said ash and particulate material to a sluice means.

Under such conditions, components, and especially those under pressure, are liable to be subjected to corrosion. This can be avoided, however, by making said components of glass or a plastics material. Further, the expansion means can be subjected to cavitational damage, if liquid and solid particles are not effectively separated upstream of said means. If a rotary expansion machine is used, for example, a rotary gas turbine particular attention must be paid to lubrication, in view of the low temperatures with which the process here is concerned, and also to the risk of damage due to the formation of ice on the turbine blades. These problems, however, can be obviated, by using an expander of the screw rotor type instead of a turbine.

Figure 2:
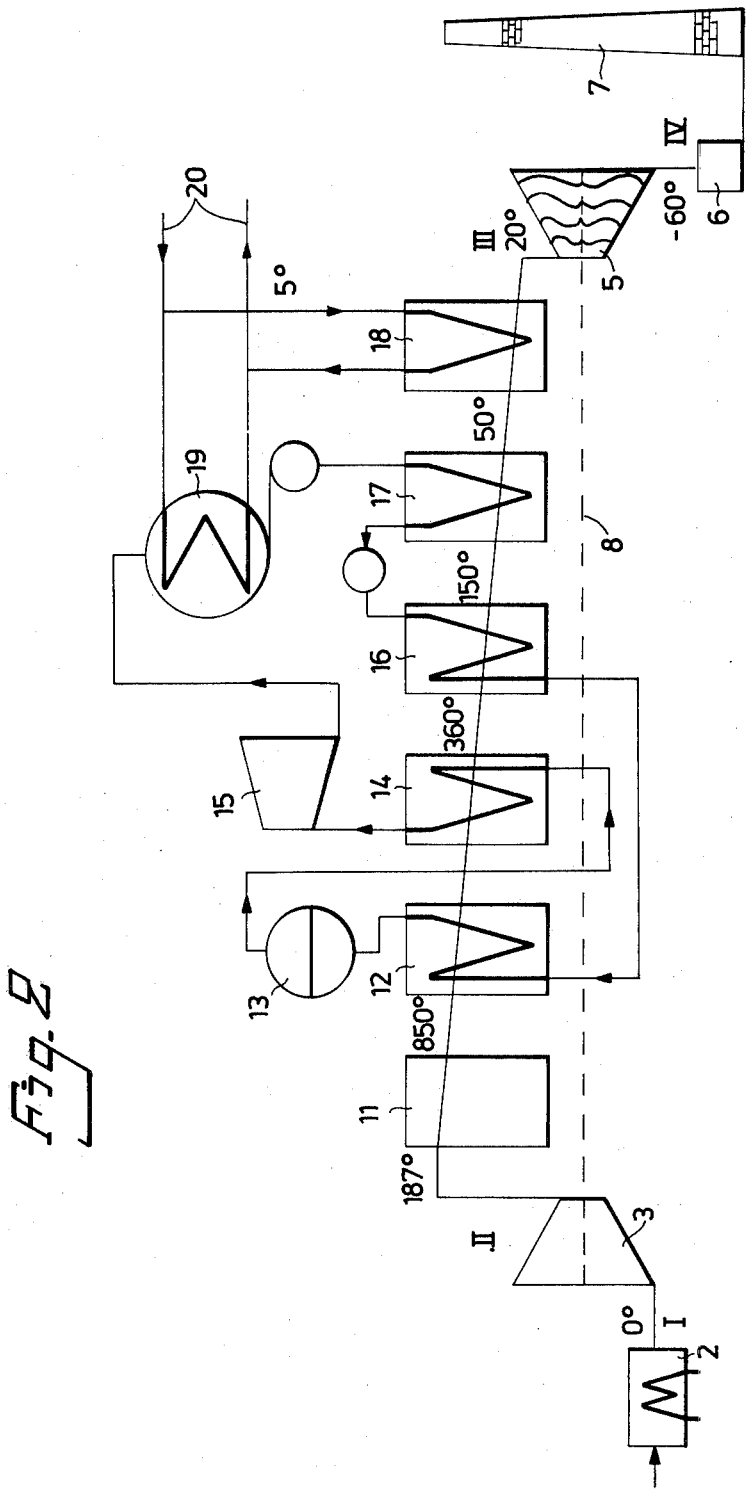

The invention will now be described with reference to a number of exemplary embodiments illustrated in the accompanying schematic drawings, in which FIG. 1 illustrates diagrammatically the invention where combustion of the fuel takes place downstream of the compressor, and FIG. 2 illustrates in a more comprehensive manner the process shown in FIG. 1.

The process shown generally in FIG. 1 and in more detail in FIG. 2 includes a boiler 1 located on the pressure side of the compressor 3. To advantage there can be used here as an alternative for the combustion process, a combustion engine, preferably a diesel engine, which is fed by the compressor 2. The process illustrated in FIG. 3 passes through the following stages: The value given in the figure are based on a volume of gas passing through the boiler, and more specifically the amount of air required to burn 1 kilogram of oil.

The air of combustion is taken from the ambient air and is caused to pass the cooler 2, where it is cooled by the cold waste gases, in order to reduce the load on the compressor. The aforementioned state I prevails when:

Mass M=15 kg.
Pressure $P_1$=1 bar.
Temp. $T_1$=0° C.

The air contains 57 grams of water vapour, saturated air.

The air is then compressed in the compressor 3. Because of losses in efficiency, it is necessary for the work input to be higher than is theoretically necessary. This results in a temperature increase above that which is justified by the adiabatic compression. The state II prevails when:

Pressure $P_2$32 5 bars.
Temp. $T_2$=187° C.

The oil is then burned in the pressurized system together with combustion air, and the waste gases are caused to pass through the boiler 1, in the usual manner.

As will be seen from FIG. 2, the boiler 1 comprises, in the order given, a combustion chamber 11, a steam generator 12 having connected thereto a steam dome 13, a superheater 14 connected to a steam turbine 15, an economizer 16 and a gas scrubber 17, followed by a gas cooler 18. Connected between the steam turbine 15 and the scrubber 17 is a condensor 19 having a cold-water circuit 20, which is also coupled to the gas cooler 18.

If the temperature of the cold water available is 10° C., the condensor temperature can be held at 25° C. This then obviates the need of a gas cooler downstrem of a economizer. If, on the other hand, the cooling water has a higher temperature, or if the waste gases are to be cleansed to a relatively high degree, a gas cooler should be used.

The aforementioned state III prevails when:

Pressure $P_3 = 5$ bars.
Temp. $T_3 = 40°$ C.

The gas contains 150 grams of water vapour.

During the combustion process, a relatively large amount of water vapour is formed, although most of this water vapour will condense in the economizer, taking with it most of the soot and solid particles contained in the waste gases. Herein lies part of the high efficiency of the process. The process water, or condensate, is passed from the boiler to a valve under pressure.

Subsequent to passing through the boiler, the waste gases are passed through the turbine 5, where they give up part of their energy. The adiabatic heat drop causes the remaining water content of the gases to condense into ice crystals, while the contaminants also gradually precipitate out. The resultant sludge is taken up in the collecting vessel 6, downstream of the turbine 5.

The state IV (downstream of the turbine) prevails when:
Temp. $T_4 = -33°$ C.
Pressure $P_4 = 1$ bar.

The gas contains less than one gram of water vapour.

If this final temperature does not afford a sufficiently high cleaning effect, the pressure in the boiler can be raised or, as in the following example, the temperature $T_3$ can be lowered to $+15°$ C. with the aid of the gas cooler 18.

$T_3 = 15°$ C. provides a water content of 42 grams in the total volume of gas. $T_4$ then becomes $-66°$ C.

$T_4$ is a result of (a) the adiabatic temperature difference, (b) the losses in turbine efficiency (which leads to an increase in gas temperature) and (b) the heat of vapourization plus the heat of fusion of that part of the water which has condensed out downstream of the turbine. It can be shown that a final temperature of $-55°$ C. to $-60°$ C. provides a very high cleaning effect, and that $T_3$ is then suitably about 20° C. Thus, in the example illustrated in FIG. 3, using the gas cooler 18 with the cooling water at 5° C., which results in $T_3 = 20°$ C., state IV prevails when:
Pressure $P_4 = 1$ bar.
Temp. $T_4 = -60°$ C.

When the final temperature is below $-60°$ C., carbon dioxide will begin to condense. Although carbon dioxide is a product which can be utilized commercially, its production in the present case may give rise to certain problems.

Because the process of combustion takes place under pressure in the boiler 1, the flame volume is reduced, while the rate of combustion and the flame temperature, and therewith the intensity of the radiation, increases, as compared with conventional boilers. Thus, the boiler used in accordance with the invention is smaller than normal. This is important, inter alia, when converting an old system to a modern, clean and economic system according to the invention, since it is only the boiler which need be replaced.

When the combustion process is carried out in accordance with the invention, it is possible to use oil, coal or peat having a water content in excess of 50%. In normal cases with a pressure of 64 bars in the steam cycle, a condensor temperature of 30° C. and a boiler pressure of 5 bars, the maximum water content for oil is 55% and for coal 56%, said percentages being % by weight.

It will readily be appreciated that the possibility of effectively burning fuel in the form of powdered coal having a high water content is of great significance. It is then possible to pump powdered coal mixed with water into the combustion space of the boiler. Such fuel is called liquid coal and can be handled in a manner similar to oil. A Swedish product of this kind is sold under the name "CARBOGEL" and contains finely ground coal and water, together with additions which prevent the coal from settling. This fuel has an energy content of 8.9 MWh/m$^3$, compared with a valve of 10.3 MWh/m$^3$ in the case of oil, from which it will be seen that the price will be considerably less than half the price incurred when burning oil.

With respect to the fact that the process according to the invention is a continuous process, which enables large volumes of gas to be treated without the addition of chemicals, it will be seen that important advantages are afforded over conventional processes, which require the provision of expansive equipment for cleansing the waste gases, which cleansing is carried out discontinuously in known systems and plants.

We claim:
1. A combustion process which provides an exhaust gas free of water vapor and other desirable contaminants, such as sulphur compounds, heavy metals and the like, including the steps of:
   compressing air to be used for combustion,
   burning fuel with the compressed combustion air in a combustion chamber,
   directing the exhaust gases from the combustion chamber to an expansion means, and
   expanding the heated exhaust gases in the expansion means to cause rapid cooling to a temperature of at least below zero degrees Celsius and drop in pressure of the exhaust gases to condense water vapor contained therein and to precipitate the undesirable contaminants.

2. The combustion process of claim 1 in which the heated exhaust gases are expanded in the expansion means to cause rapid cooling to a temperature of at least below minus 33 degrees Celsium.

3. The combustion process of claim 1 in which the heated exhaust gases are expanded in the expansion means to cause rapid cooling to a temperature of at least below minus 60 degrees Celsius.

* * * * *